Sept. 1, 1964

T. UJEJSKI 3,147,473

SYNCHRO ARRANGEMENT

Filed March 6, 1961

Sept. 1, 1964  T. UJEJSKI  3,147,473
SYNCHRO ARRANGEMENT
Filed March 6, 1961  2 Sheets-Sheet 2

INVENTOR
TADEUSZ UJEJSKI

BY

ATTORNEYS

UNITED STATES PATENT OFFICE 3,147,473
Patented Sept. 1, 1964

3,147,473
SYNCHRO ARRANGEMENT
Tadeusz Ujejski, Bedfont, Feltham, England, assignor to Epsylon Research and Development Company, Limited, Feltham, England
Filed Mar. 6, 1961, Ser. No. 93,677
Claims priority, application Great Britain Feb. 17, 1961
4 Claims. (Cl. 340—347)

This invention relates to a method and apparatus for defining the rotational position of a synchro rotor by deriving from the three synchro stator voltages an alternating voltage which is of substantially constant amplitude and varies in phase with respect to a reference frequency by an amount which corresponds to the rotational position of the synchro rotor.

Synchros and their companion instruments, Magslips, are used in a large variety of alternating current control applications including controls for ships, aircraft and industrial automation processes, and the methods of using the instruments for such purposes are, in general, well known.

It may at times be desired to indicate the position of a particular member associated with, or operated by, a synchro at a particular instant, or to record its position. Such a case arises, for example, in aircraft crash recorders in which the positions of various members which are part of the aircraft control system are recorded at regular intervals, many of these members comprising, or being associated with, synchros.

One object of the invention is to provide a simple method and apparatus for indicating or recording the position of a synchro rotor.

Another object of the invention is to provide a method and apparatus for deriving from the three synchro stator voltages an alternating voltage which is of substantially constant amplitude but which varies in phase with respect to a reference frequency by an amount which corresponds to the rotational position of the synchro rotor.

A further object is to provide a method and apparatus for converting the rotational position of a synchro rotor into a digital count which may readily be displayed or recorded.

The invention consists of a method and apparatus for defining the rotational position of a synchro rotor comprising transformer means connected to the three windings of the synchro stator adapted to produce two outputs which vary through zero and maximum values as the rotor rotates, the maxima of the two outputs being displaced by 90° of rotation of the synchro rotor, the two outputs being connected in series, a capacitor and a resistor connected in series with the two outputs, and connections to the junction of the two outputs and the junction of the capacitor and resistor to derive therefrom a voltage having the same frequency as the synchro energizing voltage but phase-displaced with respect thereto by an amount which depends upon the rotational position of the synchro rotor.

The transformer means may comprise a pair of T connected or Scott-connected transformers, or another synchro element including two windings having mutually perpendicular axes on its rotor, the rotor being prevented from rotating.

According to a feature of the invention the output may be converted to digital form by means of a gate and a clock pulse generator, the gate being opened when the energizing voltage of the synchro reaches a predetermined instantaneous value and closed when the output voltage reaches a predetermined instantaneous value, the number of clock pulses passing through the gate being a measure of the phase difference between the energizing voltage and the output voltage.

To promote a ready understanding of the invention and the practical arrangement thereof an embodiment and a modification will now be described with reference to the accompanying drawings, in which—

Figure 1:
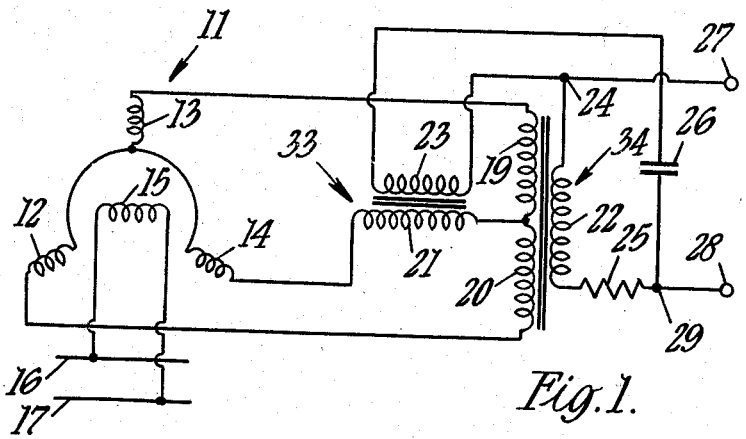
FIGURE 1 shows diagrammatically an arrangement according to the invention employing a pair of T or Scott-connected transformers.

Referring to the drawings, FIGURE 1 shows diagrammatically a synchro, generally indicated by reference 11, having three stator windings 12, 13 and 14, which are star-connected, and a rotor provided with a winding 15. The synchro may be a control transmitter having the winding 15 connected to an energizing alternating current supply represented by the lines 16 and 17, or it may be another type of synchro which is connected to and is part of a more complex synchro system.

In the position shown in FIGURE 1 the axis of the rotor winding 15 is at right-angles to the axis of the stator winding 13 and if the rotor winding is energized with alternating current, for example at the 60 c./s. mains frequency, then the rotor winding 15 sets up an alternating field whose axis is coincident with the axis of the winding 15. Since this axis is at right angles to the stator winding 13 no output appears in the winding 13. If the rotor of the synchro is slowly rotated clockwise from this position then a voltage appears in the winding 13 which will be assumed to be in phase with the supply voltage and will be referred to as a "forward voltage." This forward voltage progressively increases until it reaches its maximum when the axis of the rotor winding 15 is in line with the axis of the stator winding 13. With continued rotation of the rotor the voltage induced in the stator winding 13 progressively decreases until after 180° rotation of the rotor it again reaches zero, when the axis of the winding 15 is again at right angles with the axis of the stator winding 13. With further rotation of the rotor winding 15 a voltage again appears in the winding 13 but it is now of reversed polarity, that is to say, it is in anti-phase with the supply voltage. This will be referred to as a "reverse voltage." The reverse voltage induced in the stator winding 13 passes through its maximum when the rotor is rotated by 270° from its initial position, when the axis of the rotor winding 15 is again in line with the axis of the stator winding 13, and then progressively decreases to zero as the rotor completes a full revolution. The rise and fall of the voltage in the stator winding 13 for one full revolution of the rotor winding 15 is illustrated graphically in the curves of FIGURE 5, where it is given the reference 51. The voltage induced in the stator winding 14 follows exactly the same sequence but since the axis of the stator winding 14 is physically displaced by 120° from the winding 13 in the direction of rotor rotation the sequence follows 120° later in the rotation of the rotor. The voltage wave of stator winding 14 is represented by the dotted curve 52 in FIGURE 5. Similarly the curve of the voltage induced in the stator winding 12 is exactly the same but displaced by 240° of rotor rotation and this voltage accordingly is represented by the chain dotted curved 53 of FIGURE 5.

A synchro of the type under discussion is basically a three-phase alternator and if the rotor were energized with D.C. and were driven at the synchronous speed of 60 revolutions per second then it would produce a three-phase output at mains frequency. However, it is not normally used in this manner and in its accustomed use, as a synchro, the rotor is fed with alternating current and sets up an alternating magnetic field which induces voltages in the three stator windings while the rotor is stationary. These voltages are all in phase with the single phase supply, although either one or two of the three voltages may at any instant have reversed polarity. Reversed polarity implies, of course, that they are 180° out of phase with the supply voltage, but in order to avoid confusion with three-phase voltages it is better to regard the synchro stator voltages as being in phase with each other and either of the same polarity or reversed polarity with respect to the supply voltage. The terms "forward voltage" and "reverse voltage" will be used respectively to describe such voltages.

A transformer 33 has a primary winding 21 and a secondary winding 23, and a further transformer 34 has a centre-tapped primary winding comprising sections 19 and 20 and a secondary winding 22. One end of the primary winding 21 is connected to the centre tap of the primary winding of the transformer 34. This is the well-known T or Scott-connection and in its normal use the outer ends of the primary sections 19 and 20 and the outer end of the primary winding 21 are connected to the three phases of a three-phase supply. The secondary windings 22 and 23 are connected together at the junction 24 and the outer ends of the windings 22 and 23 and the junction point 24 provide a true two-phase three-wire supply. This is the well known use, but in the present instance the Scott transformer arrangement is used in a somewhat different manner.

Figure 6:
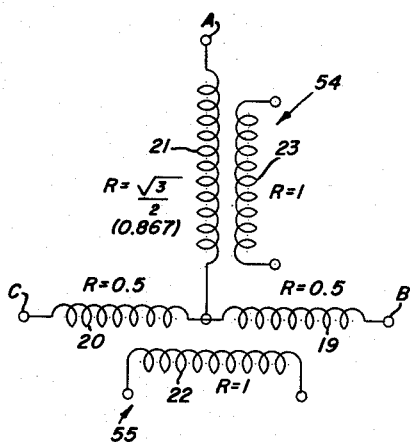
FIGURE 6 is a connection diagram of a pair of Scott or T connected transformers.
Figure 7:
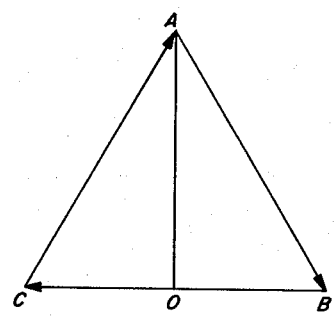
FIGURE 7 is a vector diagram of the voltages in the transformer windings of FIGURE 6.

FIGURES 6 and 7 show respectively the windings of the two transformers of the Scott or T connected set 18. As is well known Scott connected transformers may be used to derive a three-phase supply from the two-phase supply or to derive a two-phase supply from a three-phase supply. Assuming that a three-phase supply is to be derived from an available two-phase supply, the operation illustrated in FIGURES 6 and 7 is as follows. The first transformer 54 has the primary winding 23 and the secondary winding 21. The second transformer 55 has the primary winding 22 and the secondary winding which is centre-tapped to produce the two halves 19 and 20. The voltages of the two phases of the two phase supply are, of course, identical and the primary windings 23 and 22 are wound for these voltages. The secondary winding 21 is joined to the centre tap of the secondary winding constituted by the halves 19 and 20. The three output terminals which produce the three-phase supply are labelled A, B and C in FIGURE 6 and in FIGURE 7, which is a vector diagram of the transformer voltages. It will be assumed that the three-phase voltage is to be the same as the two-phase voltage.

Currents in the primary windings 22 and 23 are phase-displaced by 90° and the voltages induced in the associated secondary windings have the same phase difference. The E.M.F. between the terminals A and B is accordingly the resultant of the full E.M.F. induced in the secondary winding 21 and one-half the E.M.F. induced in the secondary winding 19, 20. That is to say, the E.M.F. consists of the E.M.F.'s induced in the secondary windings 21 and 19, the latter being phase-displaced by 90° with respect to the former. In FIGURE 7, OA is the E.M.F. induced in the secondary winding 21 and OB is the E.M.F. induced in the secondary winding 19. The resultant E.M.F. is thus AB which may be measured between the terminals A and B. In the same way the voltage CA is the resultant of the E.M.F. induced in the secondary winding 21 and the half secondary winding 20. In order to produce a true three-phase voltage, in which the three E.M.F.'s are equal and the phase displacement between the phases is 120°, the number of turns of the secondaries are so chosen that OB is one-half AB. It follows that $AB=BC=CA$ and OA is equal to $$AB\frac{\sqrt{3}}{2}$$

Assuming that the turns on the primary windings 22 and 23 are equal and the number of each is in the ratio 1, the turns on the half-secondary 19 and the half-secondary 20 are each in the ratio 0.5 and the turns on the secondary 21 are in the ratio $$\frac{\sqrt{3}}{2}=0.867$$

The preceding explanation of the operation of the Scott connection is given merely to establish the turns ratios in the transformers. In the invention the transformers are not used to produce phase-displaced voltages but are used to add and subtract synchro voltages which, as previously established, are all in phase with each other.

The manner in which the Scott connected transformers produce two voltages which are in phase with each other but which vary with synchro rotor rotation in such a manner that they reach their respective maximum and zero values spaced apart by 90° of synchro rotor rotation will now be explained with reference to FIGURE 5. For the purpose of this explanation the maximum voltage of any synchro stator winding will be designated E.

Figure 5:
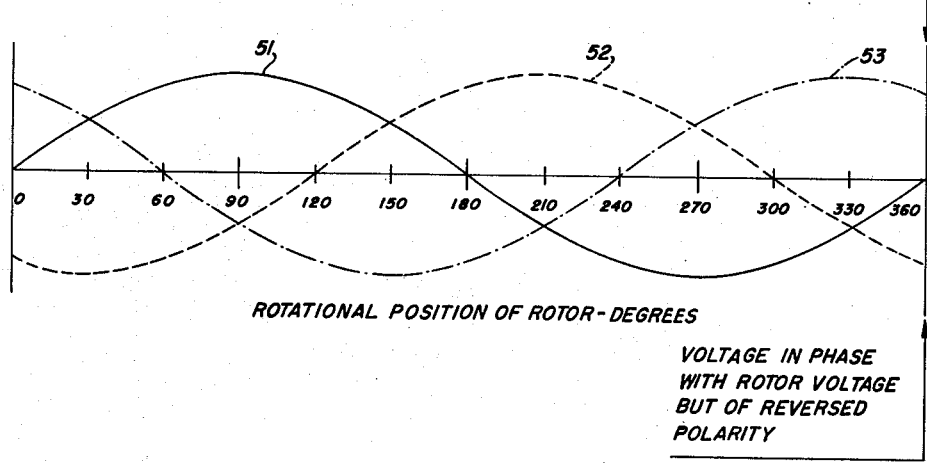
FIGURE 5 shows a voltage diagram of the outputs of the three stator windings of a synchro.

At the position shown in FIGURE 1 the voltage in the stator winding 13 is zero, as indicated by curve 51 in FIGURE 5, while the voltage in the winding 14 is sin 60°E reversed, that is 0.867E reversed and the voltage produced by the stator winding 12 is 0.866E forward. If the synchro rotor is rotated through 30° clockwise then, as shown in FIGURE 5, the stator winding 13 produces a voltage of 0.5E forward (i.e. sin 30°E forward) the stator winding 14 produces a voltage of 1E reversed and the stator winding 12 produces a voltage of 0.5E forward. These figures are marked in the first line of the accompanying table. The voltages from windings 12 and 13 are applied to the two winding sections 19 and 20 of the transformer 55 and since they are both forward voltages, and are equal, and the currents pass in opposite directions through the winding sections, no resultant flux is produced in the core and no voltage appears at the secondary winding 22. This is also shown in the first line of the table. The currents from the rotor windings 12 and 13 both pass through the winding 21 of the transformer 54 in the same direction and produce a flux in the core which in turn induces a voltage in the winding 23. This is a maximum voltage.

Table

| Line | Rotor Position, Degrees | Synchro Stator Voltages | | | Transformer Output Voltages | |
|---|---|---|---|---|---|---|
| | | Winding 13 | Winding 14 | Winding 12 | Winding 22 | Winding 23 |
| 1 | 30 | 0.5E f | 1E r | 0.5E f | 0 | Max. r. |
| 2 | 120 | 0.867E f | 0 | 0.867E r | Max. f. | 0. |
| 3 | 210 | 0.5E r | 1E f | 0.5E r | 0 | Max. f. |
| 4 | 300 | 0.867E r | 0 | 0.867E f | Max. r. | 0. |

If now the rotor is turned clockwise through 90°, that is to say, 120° from the position shown in FIGURE 1 then, as shown in FIGURE 5, the stator winding 13 produces a voltage of 0.866E forward, the winding 14 produces zero voltage and the winding 12 produces a voltage of 0.866E reversed. These two voltages act in series aiding across the winding halves 19 and 20 in series, and produce a flux in the core of the transformer 55 which induces a maximum voltage in the secondary winding 22. Since one voltage is a forward voltage and the other is a reversed voltage the tapping point between the sections 19 and 20 is at zero volts. Since winding 14 is producing zero volts there is no voltage across the winding 21, so no current flows, and no voltage appears in the winding 23. This is shown in line 2 of the table.

Rotation of the rotor winding 15 through a further 90°, that is to a position 210° from that shown in FIGURE 1, produces the voltages shown in the third line of the table and rotation of the rotor winding 15 through a further 90°, that is to a position 300° from that shown in FIGURE 1, produces the voltages shown in the fourth line of the table. From this table it is evident that the voltages appearing in the secondary windings 22 and 23 reach their maxima and minima at intervals of 90° of rotor rotation and are displaced from each other by 90° of rotor rotation. At rotor positions intermediate those shown in the table, voltages will appear in both secondary windings which, if plotted together with the maxima and minima, will produce two waves which are similar to the waves 51, 52 and 53, but which are displaced from each other by 90° of rotor rotation.

The winding 13 of syncho 11 is connected to the outer end of the winding section 19 of transformer 34, the winding 12 is connected to the outer end of section 20 while the outer end of winding 14 is connected to the outer end of winding 21 of transformer 33.

If it is desired to record the rotational position of the synchro, for example by magnetic recording, then it could be done by recording the magnitudes of the three stator voltages 12, 13 and 14. If an in-phase voltage is regarded as a positive quantity and a voltage in phase opposition is regarded as a negative quantity than the algebraic sum of the three synchro stator voltages at any instant is zero. It would therefore be possible to define the rotor position by recording only two of the voltages, provided that the reproducing means could recognise the difference between the in-phase and phase opposition voltages, and their magnitude, and provided also that a computing device were provided to calculate the third voltage. This would involve recording a reference voltage. Thus to record the necessary data for one syncho would involve three recording tracks but there would be a saving if the positions of a number of synchros were to be recorded. For example, two synchro positions could be recorded on 5 tracks, three synchro positions on 7 tracks, and so on, since only one reference voltage would need to be recorded. As will later appear, the invention enables the synchro position to be recorded on one track.

The windings 22 and 23 are connected in series at the junction 24. The outer end of the winding 22 is connected to a resistor 25 and the outer end of the winding 23 is connected to a capacitor 26, the resistor and capacitor being connected together at the junction 29. The junctions 24 and 29 are respectively connected to output terminals 27 and 28. By appropriate choice of the values of the resistor 25 and the capacitor 26 it is easy to arrange that the voltage at the output terminals 27 and 28 is of substantially constant amplitude but, owing to the presence of the resistor and capacitor, it varies in phase with respect to the energizing voltage on the lines 16, 17 by an amount which depends upon the rotational position of the rotor.

Figure 2:
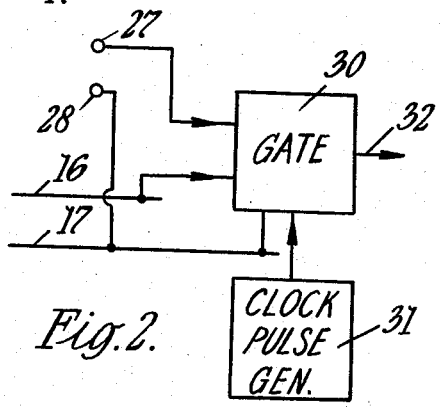
FIGURE 2 shows a gate and a clock pulse generator to be used in conjunction with the arrangement of FIGURE 1.

According to a feature of the invention the output voltage at the terminals 27 and 28 is converted to digital form by the means shown in FIGURE 2. A gate 30 and a clock pulse generator 31 are provided, the latter producing pulses at a known rate. One of the output terminals 27 is connected to one control input of the gate and the line 16 is connected to the other control input of the gate. The output terminal 28 is connected to the line 17, which is a "common" line and is connected to the "common" terminal of the gate. The clock pulse generator is connected to the controlled input of the gate.

In operation, when the input voltage on the line 16 reaches a predetermined instantaneous level (which may be its maximum) it opens the gate 30, whereupon pulses from the generator 31 pass through the gate to the output line 32. When the instantaneous value of the output voltage on the terminal 27 rises to a predetermined level (which may be its maximum) it closes the gate 30, whereupon the pulses on the output line 32 cease. It will be apparent that the number of pulses appearing at the output line 32 is a measure of the phase difference between the energizing voltage on the lines 16, 17 and the output voltage on terminals 26, 28 and since this phase difference depends upon the rotational position of the synchro rotor a digital count corresponding to the rotor position is available. This may be recorded on a single track of a magnetic tape without any need to record a reference voltage as well.

Figure 3:
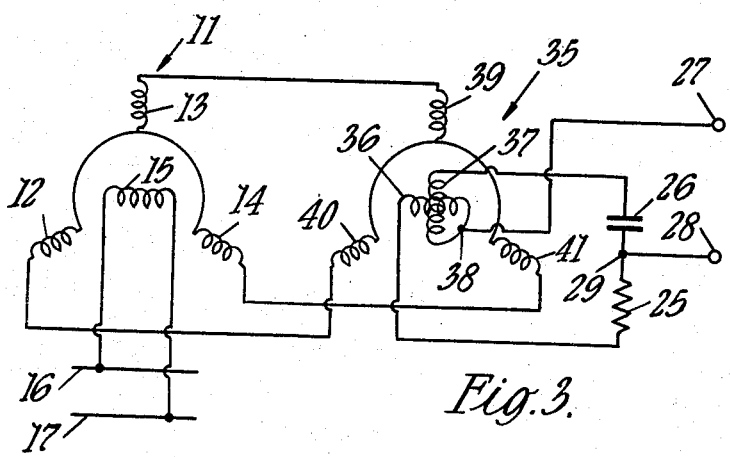
FIGURE 3 shows a modified arrangement in which an additional synchro element having two windings at right angles on its rotor is used in place of the T connected transformers.

In FIGURE 3 a second synchro 35 has been substituted for the Scott connected transformers. The synchro 35 has three stator windings 39, 40 and 41, which are preferably identical with the windings 12, 13 and 14, but it differs from the synchro 11 in that the rotor has two windings 36 and 37 arranged with their axes at right angles. A synchro of this type may be used to derive a two-phase voltage from a three-phase voltage or vice versa. For example, if the rotor is held still and a three phase voltage is applied to the windings 39, 40 and 41, a rotating field will be produced and voltages will be induced in the rotor windings 36 and 37 which obviously are 90° phase-displaced from each other. In a similar manner if a two-phase voltage is applied to the rotor windings 36 and 37 they will produce a rotating field which induces voltages in the windings 39, 40 and 41 which are phase-displaced from each other by 120°, i.e. they constitute a three-phase voltage. This is a special use of the synchro and is only mentioned to show that it will operate in the same way as the Scott connected transformers. In the invention the three voltages derived from the windings 12, 13 and 14 of synchro 11 are single-phase voltages in phase with each other, that is to say, they are in phase with each other but may be of forward or reversed polarity. The voltages applied to the stator windings 39, 40 and 41 combine to set up an alternating field which does not rotate, but whose axis corresponds exacty with the axis of the rotor winding 15. This field induces voltages in the windings 36 and 37 which are in phase but which vary when the rotor of the synchro 35 is slowly rotated from zero to a maximum forward voltage and back to zero, then through a maximum with reversed polarity and again back to zero. Clearly, since the axes of the windings 36 and 37 are set at 90° to each other, the maxima and minima of the voltages induced in the two synchro rotor windings are separated by 90° of rotor rotation and this produces the desired voltage relationships across the resistance 25 and the capacitor 26.

The advantage of using a synchro element is that the load imposed by the three windings of the synchro 35 on the three windings of the synchro 11 is substantially perfectly balanced and any unwanted phase shifts which occur will be substantially equal in the three windings, whereas it is much more difficult so to design and make the two transformers 33 and 34 that the loads and phase shifts are exactly balanced. A further advantage is that is it possible to set the system up initially to a zero condition or any other desired condition by rotating the rotor of the synchro 35 and means for making such adjustment are illustrated in FIGURE 4.

Figure 4:
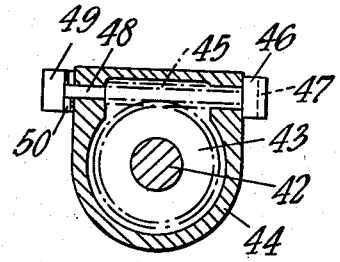
FIGURE 4 shows a device fitted to the rotor of the additional synchro element to provide for initial adjustment thereof.

Referring to FIGURE 4, the spindle of the synchro 35 is shown in transverse section at 42. Mounted upon the spindle 42 by any desired means is a worm wheel or the like 43. The spindle 42 and the wheel 43 are adapted to rotate in a fixed casing 44 which contains bearings for a screwed member 45 which engages the teeth of the wheel 43. The member 45 has a head 46 provided with a slot 47 for engagement by a screw driver and, at its opposite end, a reduced diameter portion 48. A collar 49 is fixed to the small diameter end 48 and a crimped spring washer 50, or the equivalent, is interposed between the face at the end of the casing 44 and the collar 50, to provide a friction grip. Rotation of the screw member 45 by means of a screw driver enables the synchro rotor to be turned to a desired position during initial setting up of the system.

It will be understood that adjusting means alternative to that illustrated in FIGURE 4 may readily be devised by persons properly skilled in the art and that other modifications may be made in practical forms of the invention.

I claim:

1. Apparatus for defining the rotational position of a synchro rotor comprising a synchro having three stator windings, a first transformer having a primary and a secondary winding, a second transformer having a centre tapped primary winding and a secondary winding, said transformers having their primaries connected in T or Scott-connection, said primary windings being connected respectively to the stator windings of said synchro, said secondary windings being connected in series, a resistor and a capacitor connected in series with each other and with said secondary windings, output terminals connected to the junction of said secondary windings and the junction of said resistor and capacitor, a gate adapted to be opened by a voltage applied to one input terminal and to be shut by a voltage applied to another input terminal, a further input terminal and an output terminal on said gate which are connected together when said gate is open, a clock pulse generator connected to said further input terminal, and a source of reference voltage connected to one of the input terminals of said gate, said output voltage being connected to the other input terminal of said gate, whereby the number of pulses passing through said gate depends upon the phase difference between said output voltage and said reference voltage.

2. Apparatus as claimed in claim 1 wherein said source of reference voltage is the energizing voltage of said synchro.

3. Apparatus for defining the rotational position of a synchro rotor comprising a synchro having three stator windings, a second synchro having three stator windings and two mutually perpendicular rotor windings, said stator windings of said synchro being connected respectively to said stator windings of said second synchro, said rotor windings of said second synchro being connected in series, a resistor and a capacitor connected in series with each other and with said rotor windings, output terminals connected respectively to the junction of said secondary windings and the junction of said resistor and capacitor, a gate adapted to be opened by a voltage applied to one input terminal and to be shut by a voltage applied to another input terminal, a further input terminal and an output terminal on said gate which are connected together when said gate is open, a clock pulse generator connected to said further input terminal, and a source of reference voltage connected to one of the input terminals of said gate, said output voltage being connected to the other input terminal of said gate, whereby the number of pulses passing through said gate depends upon the phase difference between said output voltage and said reference voltage.

4. Apparatus as claimed in claim 3 wherein said source of reference voltage is the energizing voltage of said synchro.

References Cited in the file of this patent

UNITED STATES PATENTS

| | | |
|---|---|---|
| 2,627,598 | Browder et al. | Feb. 3, 1953 |
| 2,760,132 | Pawley | Aug. 21, 1956 |
| 2,791,744 | Carney | May 7, 1957 |
| 2,808,547 | Adler et al. | Oct. 1, 1957 |
| 2,874,352 | Durbin | Feb. 17, 1959 |
| 2,896,142 | Steinhacker | July 21, 1959 |
| 3,050,668 | Pease et al. | Aug. 21, 1962 |

OTHER REFERENCES

Grey and Wallace: Principles of Electrical Engineering, sixth edition, pages 399, Figures 347, 348; McGraw-Hill, New York, 1947.

Lauer et al.: Servomechanism Fundamentals, first edition, page 29, Figures 2, 8; McGraw-Hill, New York, 1947.